Nov. 2, 1943.    O. J. BLANCHET    2,333,356
ANTITHEFT AUTOMOBILE WHEEL AND TIRE LOCKING DEVICE
Filed May 26, 1942    2 Sheets-Sheet 1

INVENTOR.
OVILA J. BLANCHET.
BY Ely & Pattison
ATTORNEYS.

Nov. 2, 1943.  O. J. BLANCHET  2,333,356
ANTITHEFT AUTOMOBILE WHEEL AND TIRE LOCKING DEVICE
Filed May 26, 1942  2 Sheets-Sheet 2
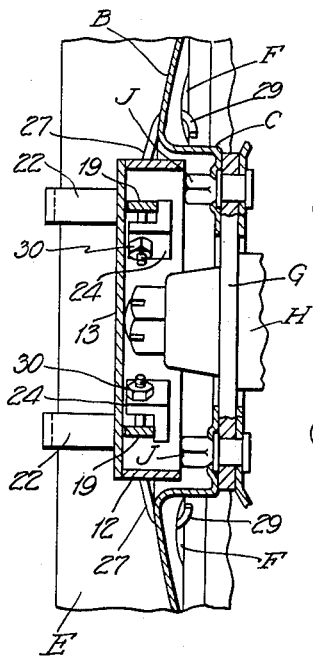
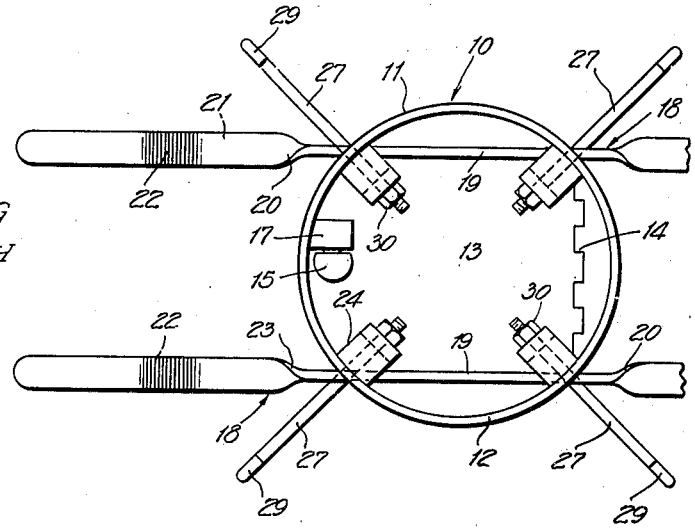
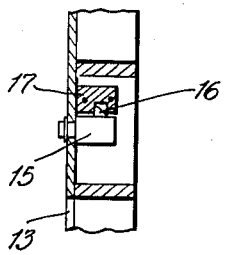
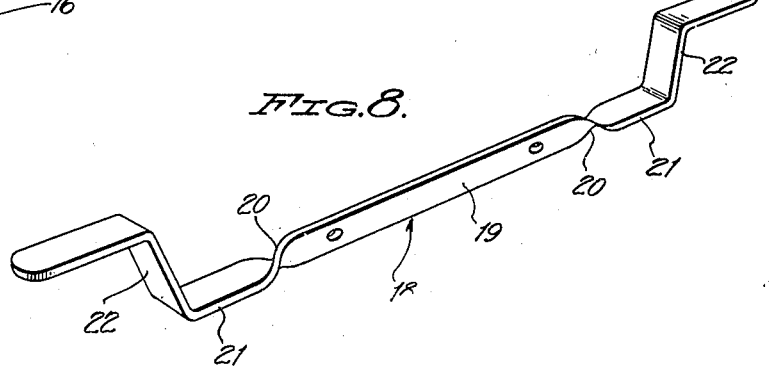
INVENTOR.
OVILA J. BLANCHET.
BY
ATTORNEYS.

Patented Nov. 2, 1943

2,333,356

UNITED STATES PATENT OFFICE 2,333,356

ANTITHEFT AUTOMOBILE WHEEL AND TIRE LOCKING DEVICE

Ovila J. Blanchet, New Bedford, Mass.

Application May 26, 1942, Serial No. 444,536

6 Claims. (Cl. 70—259)

This invention relates to anti-theft devices for automobile wheels and tires.

The primary object of the invention resides in a device for ready attachment to an automobile wheel to prevent unauthorized removal of the wheel from an axle, and the tire from the rim of the wheel.

Another object of the invention is to provide an anti-theft device for automobile wheels and tires thereof, which may be applied to wheels now in use without alterations in the wheel construction, except the slotting of the hub cap to facilitate the passage of the tire guard members.

A further feature of the invention is to provide a novel construction of anti-theft device for automobile wheels in which access for the removal of the device is through a key locked door, thus deterring any unauthorized attempt to remove the wheel as a whole, or to remove the tire from the wheel rim.

A further feature of the invention is the provision of an anti-theft automobile wheel and tire locking device which is simple and inexpensive of construction, easy to apply and remove from a wheel, and which is not objectionably unsightly when in position upon a wheel.

Other features of the invention will appear as the following specification is read in conjunction with the accompanying drawings, in which, Figure 1 is a side elevational view of an automobile equipped with the anti-theft wheel and tire locking device.

Figure 5 is an enlarged detail vertical transverse sectional view on the line 5—5 of Figure 2.

Figure 6 is a rear elevational view of the anti-theft device per se.

Figure 7 is a detail sectional view through the door lock.

Figure 8 is a detail perspective view of one of the tire guard members per se.

Figure 1:
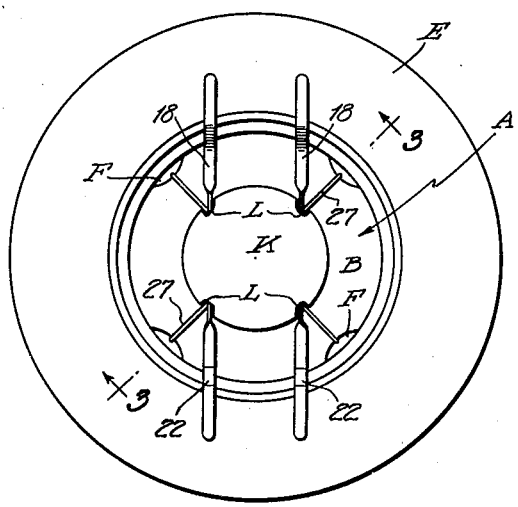
Figure 2:
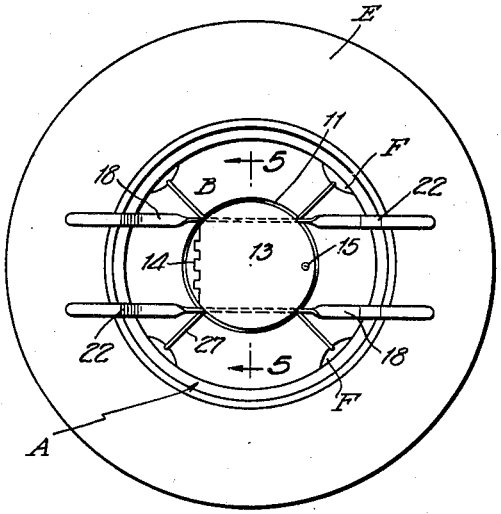
Figure 2 is a view similar to Figure 1 with the hub-cap removed and the wheel turned one-quarter revolution.

Referring to the drawings by reference characters, the letter A designates a disk-type automobile wheel which includes a disk body B, an inwardly recessed hub C, an outer circumferential rim D on which an inflated rubber tire E is mounted. The disk body B adjacent the rim D is provided with equi-distantly spaced openings F, use being made of these openings for attaching the anti-theft device to the wheel in a manner to be hereinafter fully described.

The anti-theft wheel and tire lock device is shown per se in Figure 6, and designated 10 in its entirety. The anti-theft device 10 comprises a relatively shallow housing 11 which is open at its back. The housing 11 comprises an annular side wall 12 to which a front door 13 is hingedly connected as at 14. The door 13 is provided with a key actuated lock 15 which includes a bolt 16 adapted to enter a keeper 17 fixedly secured to the annular side wall 12.

Figure 3:
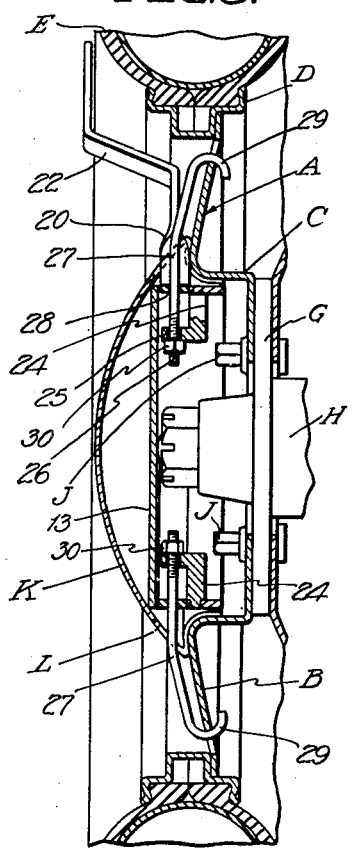
Figure 3 is a fragmentary transverse sectional view on the line 3—3 of Figure 1.
Figure 4:
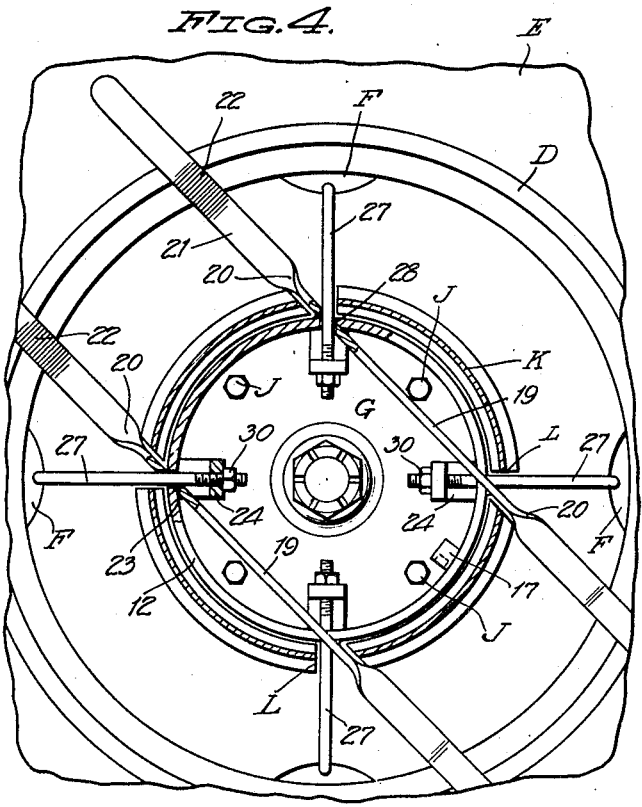
Figure 4 is an enlarged fragmentary circumferential sectional view with the wheel turned one-eighth revolution from that shown in Figure 1.

Fixedly secured to the housing 11 and extending from the annular side wall 12 are spaced substantially parallel tire guard members 18. Each tire guard member 18 is constructed from a rigid piece of flat metal and comprises an intermediate attaching portion 19 which extends through the housing 11 and outwardly through the annular wall 12, the attaching portion 19 having its flat sides disposed parallel to the axis of the annular wall 12. The metal bar from which each guard member 18 is constructed is provided with a ninety-degree twist 20 just beyond the wall 12 to provide tire guard portions 21, the outer free terminal ends of the portions 21 being offset as at 22 so as to dispose the ends of the guard members in a position adjacent the outer side wall of the tire E as best illustrated in Figure 3 of the drawings. The attaching portions 19 of the tire guard members are secured to the annular wall 12 by welding 23 so that the guard members are rigidly connected to the housing 11.

Formed integral with the annular wall 12 of the housing and extending inwardly therefrom are four equi-distantly spaced radially disposed L-shaped lugs 24 the free end of each lug 24 being substantially parallel to the wall 12 and suitably spaced therefrom, said portion being provided with an opening 25. Passing through the openings 25 of the lugs 24 are the threaded ends 26 of radially extending hook rods 27. The rods 27 freely pass through openings 28 provided in the annular side wall 12 and have their outer hook portions 29 facing rearwardly. Fastening nuts 30 are threaded to the inner threaded ends of the rods 27 for tight engagement against the lugs 24 when the device 10 is in position upon an automobile wheel.

Assume that it is desired to apply the anti-theft device 10 to the wheel A, said wheel A being mounted upon the flange G of an axle H, by means of the usual threaded bolts J. The operator first removes the hub cap K, which cap is provided with radially arranged slots L for a purpose to be hereinafter explained. The operator now applies the housing 11 with its open side against the hub C, the door 13 being unlocked and in an open position. The hooked rods 27 are pulled outwardly in a radial direction so that the hooked ends 29 pass through the openings F and engage the inner walls thereof. The nuts 30 are now tightened so as to bear against the lugs 24, thus holding the hook shaped rods 27 in clamping engagement with the disk body B of the wheel. The anti-theft device 10 is now in position and the tire guard members 18 extend outwardly from the sides of the housing with the offset ends disposed in overlapping relation with respect to the tire E. The terminal ends of the guard members 18 terminate well short of the plane of the tread surface of the tire to prevent the guard members from accidentally contacting the ground should the tire be under-inflated. The operator now locks the door 13 with the proper key and replaces the hub cap K to the hub C, the slots L in the hub cap being in register with the outwardly extending portions of the hook rods 27 and tire guard members 18. It will now be seen that even though the hub cap K is removed, access to the interior of the housing 11 may only be had by an authorized person having the proper key. Thus access to the bolts J to remove the wheel from the axle H is prevented and any attempt to remove the device 10 from the wheel is frustrated in view of the fact that it is necessary to unloosen the nuts 30 which are enclosed in the housing. Any attempt to remove the tire E from the rim D is prevented by reason of the tire guard members 18 which are disposed on the outer sides of the wheel and tire. Even though the tire E were deflated, it could not be stretched a sufficient distance to clear the offset ends 22 of the guard members 18, said members extending in pairs beyond opposite sides of the rim of the wheel. It will be understood that the device 10 may be removed from the wheel by an authorized person having the proper key to unlock the door 13, and which removal is necessary when it is desired to remove the wheel for repair purposes.

While I have shown and described what I consider to be the most practical embodiment of my invention, I wish it to be understood that such changes and alterations as come within the scope of the appended claims may be resorted to if desired.

Having thus described the invention, what I claim as new and desire to secure by Letters Patent is:

1. An anti-theft automobile wheel and tire locking device comprising a housing having a door in the front thereof and open at its rear, said housing adapted to be fitted against the hub of a wheel with its rear open side thereagainst, key actuated lock means for securing the door in closed locked position, fastening means for removably securing said housing in position upon a wheel, the manual manipulation of the fastening means to releasing position being through the door when the device is in use, and tire guard members carried by and extending outwardly from said housing for lapping relation with the tire of the wheel to be protected against theft.

2. An anti-theft automobile wheel and tire locking device as set forth in claim 1, in which the fastening means for removably securing the housing in position upon a wheel comprises radially arranged lugs fixedly connected to the housing and disposed therein, radially extending rods having hook portions at their outer ends adapted to be disposed in openings provided in the disk body of a wheel, and shank portions extending through radially alined openings provided in the housing and lugs, the free ends of the shank portions being screw threaded, and fastening nuts threaded to the threaded ends of the shanks.

3. An anti-theft automobile wheel and tire locking device as set forth in claim 1, in which each of the tire guard members comprises a rigid flat bar fastened to the inside of the housing.

4. An anti-theft automobile wheel and tire locking device comprising a metal housing open at its rear and having an annular side wall, a door closing the front of the housing, key actuated means for securing the door in closed locked position, fastening means manipulatable from within the housing for securing the housing over the hub of a wheel, and spaced parallel tire guard members carried by said housing and having their respective free ends extending outwardly from opposite sides thereof to lap the joint between a tire and its rim, each of the tire guard members comprising a flat metal bar having an intermediate attaching portion passing through slots in the annular side wall of the housing with its flat sides parallel to the axis of the annular side wall and being welded to the side wall adjacent said slots, and twisted end portions with their flat sides at right angle to the flat sides of the attaching portion, as and for the purpose specified.

5. An anti-theft automobile wheel and tire locking device as set forth in claim 4 in which the free ends of the outer twisted portions of the metal bars are forwardly offset relative to attaching portions thereof.

6. An anti-theft wheel and tire locking device comprising a housing adapted to fit against the hub of a disk wheel, a door in the front of said housing for access to the interior thereof, lock means for securing said door in closed locking position, releasable fastening means securing said housing to the hub of a disk wheel, said fastening means comprising a plurality of hook shaped rods, each hook rod having a shank portion and a hook portion adapted to hookingly engage the disk body of a wheel through openings provided therein, lugs integral with the housing and disposed therein, the shank portions of the hook rods freely passing through alined openings in the housing and lugs and having their free ends screw threaded, nuts threaded to the threaded ends of said shanks and disposed tight against the respective lugs, and means fixedly carried by said housing for lapping relation with the outer side of a tire short of the plane of the tread surface thereof to prevent unauthorized removal of said tire laterally and outwardly from its rim.

OVILA J. BLANCHET.